No. 689,909. Patented Dec. 31, 1901.
E. W. T. RICHMOND.
GAS COOKING APPARATUS.
(Application filed Dec. 14, 1900.)
(No Model.) 4 Sheets—Sheet 1.
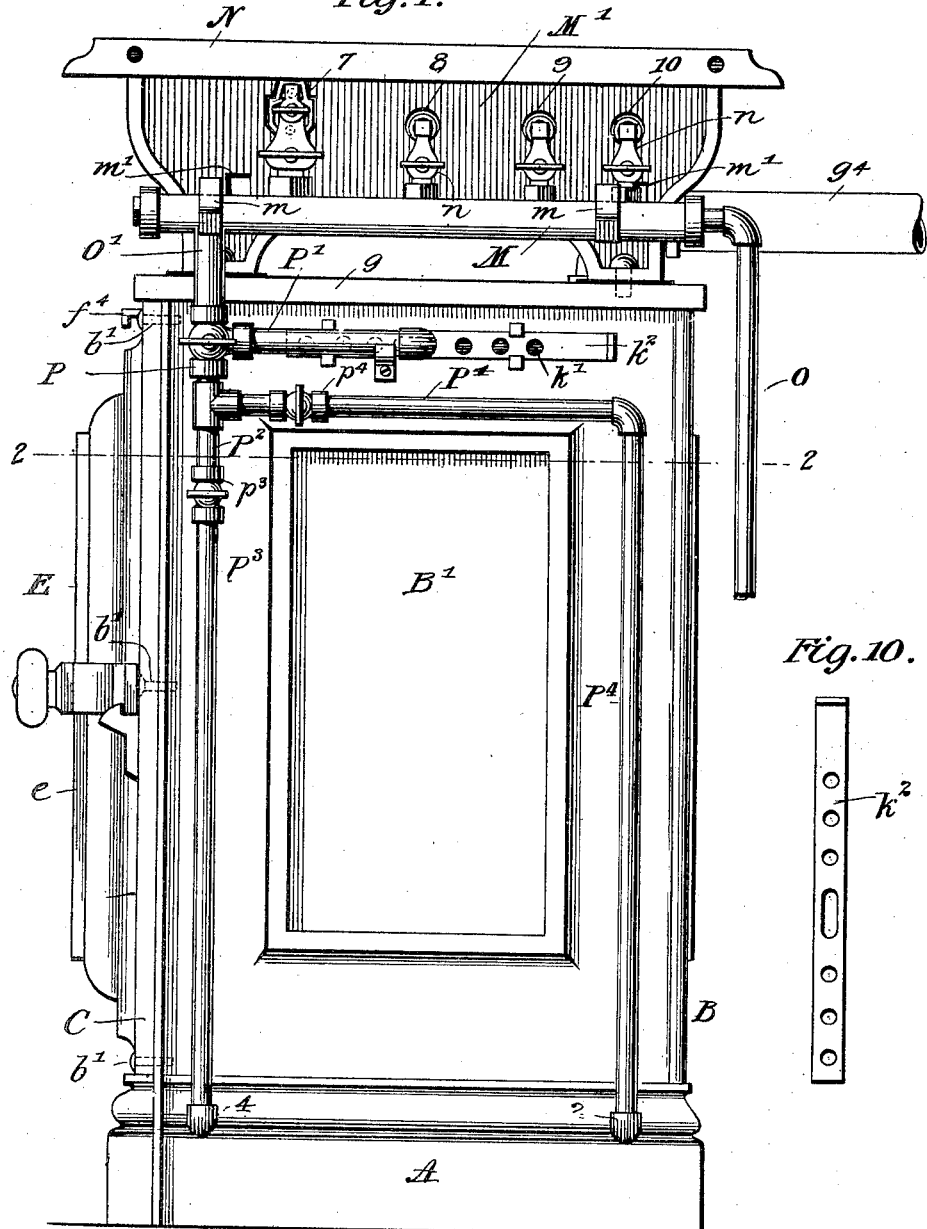
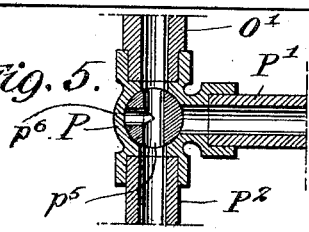
WITNESSES: INVENTOR
Edmund W. T. Richmond
BY
ATTORNEYS No. 689,909. Patented Dec. 31, 1901.
E. W. T. RICHMOND.
GAS COOKING APPARATUS.
(Application filed Dec. 14, 1900.)
(No Model.) 4 Sheets—Sheet 2.

WITNESSES:

INVENTOR
Edmond W. T. Richmond
BY
ATTORNEYS

No. 689,909. Patented Dec. 31, 1901.
E. W. T. RICHMOND.
GAS COOKING APPARATUS.
(Application filed Dec. 14, 1900.)

(No Model.) 4 Sheets—Sheet 3.

WITNESSES:
Frank S. Ober
W. W. Harrison

INVENTOR
Edmond W. T. Richmond
BY
Baldwin, Davidson & Wight
ATTORNEYS

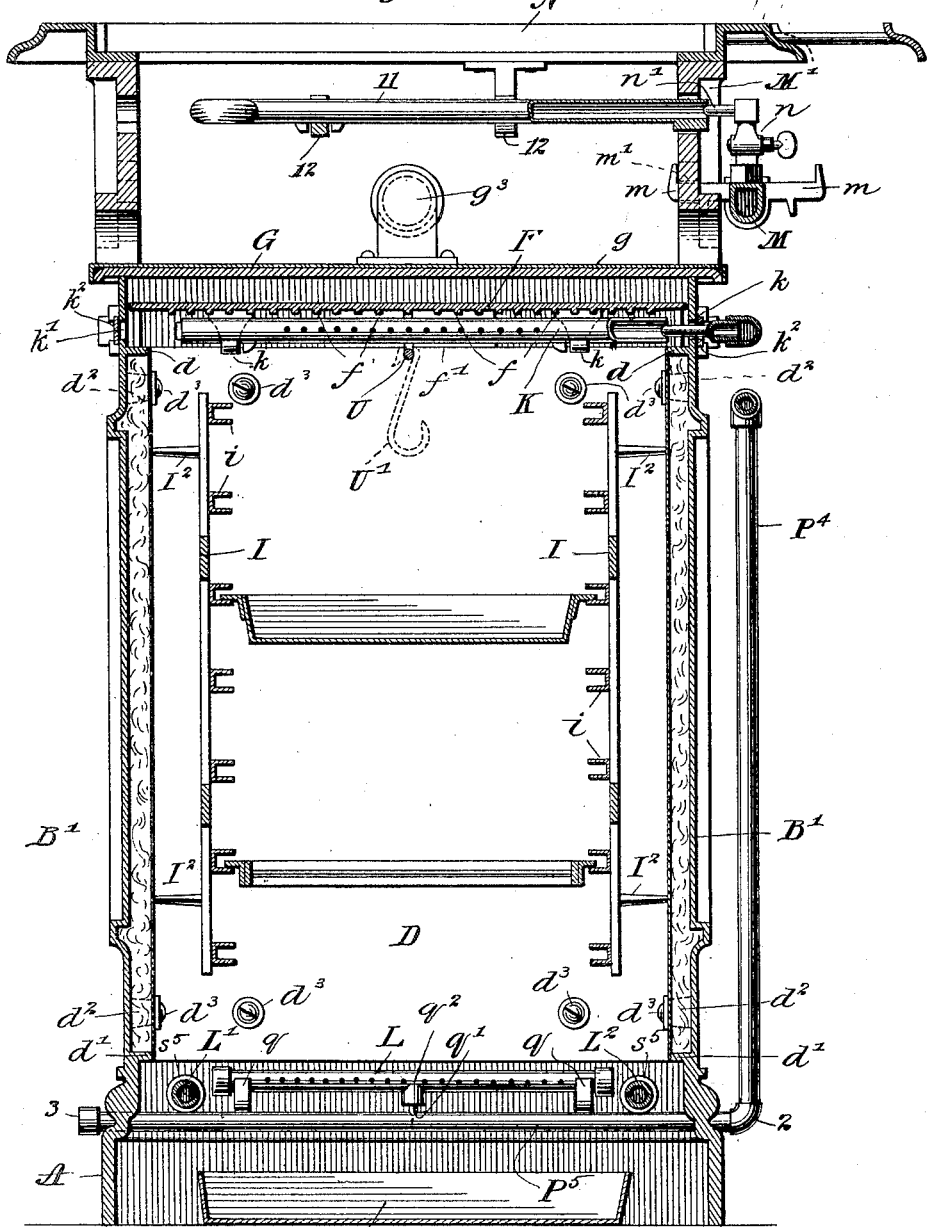

UNITED STATES PATENT OFFICE.

EDMOND W. T. RICHMOND, OF ROMFORD, ENGLAND.

GAS COOKING APPARATUS.

SPECIFICATION forming part of Letters Patent No. 689,909, dated December 31, 1901.

Application filed December 14, 1900. Serial No. 39,854. (No model.)

*To all whom it may concern:*

Be it known that I, EDMOND W. T. RICHMOND, a subject of the Queen of Great Britain, residing at Summercourt, Romford, Essex county, England, have invented certain new and useful Improvements in Gas Cooking Apparatus, of which the following is a specification.

This invention relates to the general construction of gas-cookers, and particularly to the construction of the oven portion of the cooker, the arrangement of burners therein, the connections between the burners and the gas-supply pipes, and the arrangement of frames for supporting trays and grids in the oven.

My improvements are hereinafter fully described and claimed and are illustrated in the accompanying drawings, in which—

Figure 2:
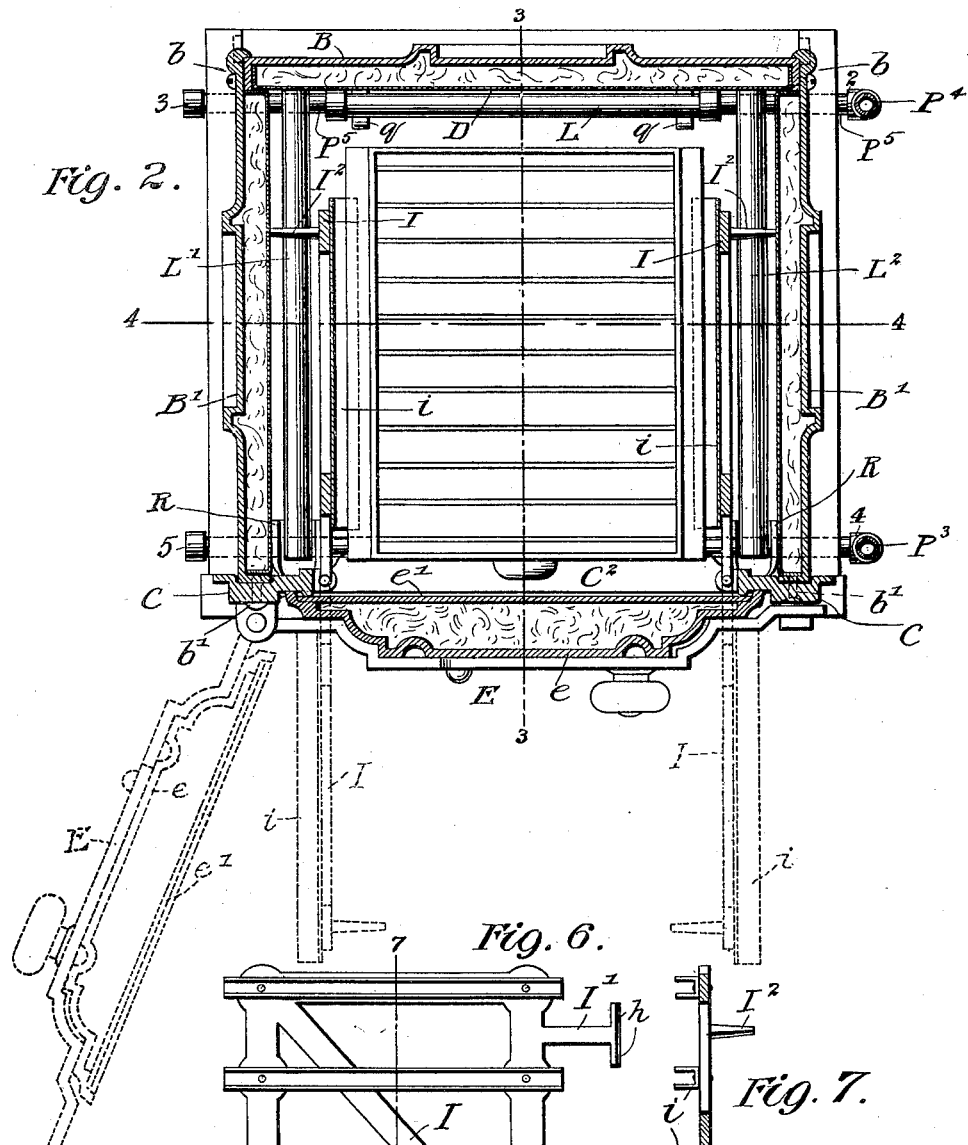
Figure 6:
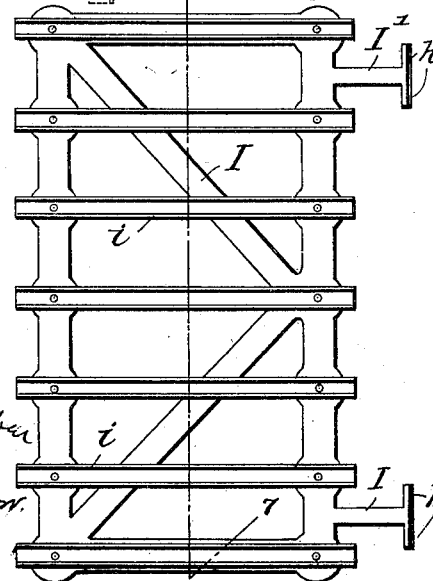
Figure 7:
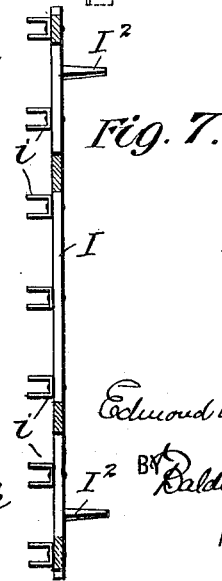
Figure 3:
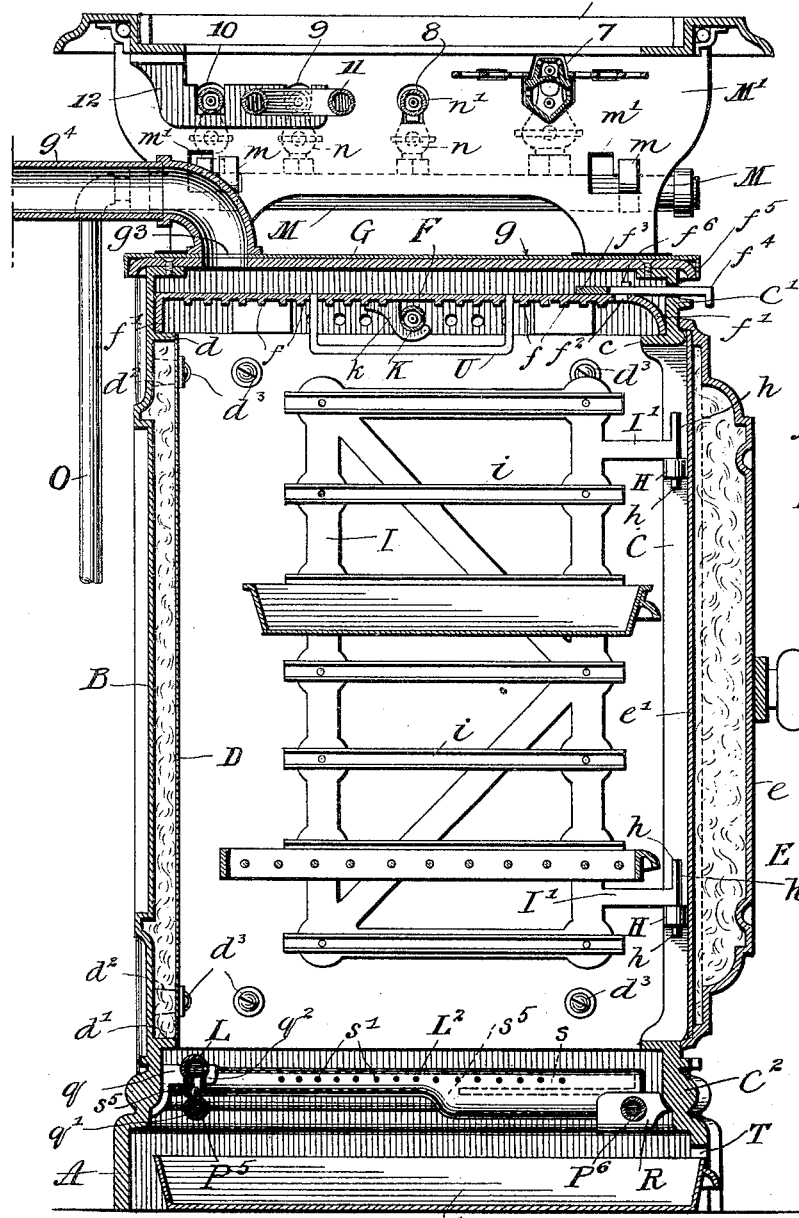
Figure 8:
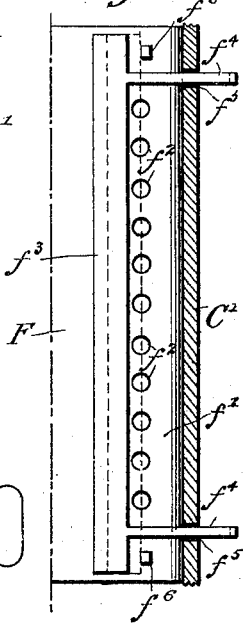
Figure 9:
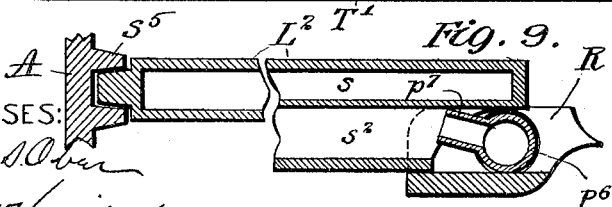

Figure 1 shows an elevation of the right-hand side of a gas-cooker embodying my improvements. Fig. 2 shows a horizontal section therethrough on the line 2 2 of Fig. 1. Fig. 3 shows a vertical section on the line 3 3 of Fig. 2. Fig. 4 shows a section at right angles to Fig. 3 on the line 4 4 of Fig. 2. Fig. 5 is a detail sectional view, on an enlarged scale, showing a two-way cock through which gas is admitted to either the upper oven-burner or the lower oven-burner. Fig. 6 is a detail side elevation of one of the swinging tray-supports. Fig. 7 is a section therethrough on the line 7 7 of Fig. 6. Fig. 8 shows an elevation, on a reduced scale, on the left-hand side of the stove, showing the hood which is mounted on the top plate thereof. Fig. 9 shows a vertical section through one of the lower burners. Fig. 10 is a detail view of the slide used for opening and closing the air-supply for one of the burners.

The body or oven portion of the stove may be composed, as shown, of a base A, upon which are mounted a rear outside wall B and outside side walls B' B', which are all bolted together at the rear corners, as at $b\ b$, and at the front the side walls are bolted, as at $b'\ b'$, to the front columns or sides C of the door frame or opening, which may be cast in one piece, with the cross-piece C' forming the top of the door-opening and that $C^2$ forming the bottom of the door-opening. The several sides and the cross-piece $C^2$ may be secured in any suitable way to the base A.

The back wall B, which may be a cast-metal plate, has formed upon it adjacent to its upper edge an inwardly-extending horizontal flange or rib $d$ and also near its lower edge a similar flange or rib $d'$. The side plates are formed with similar ribs $d$ in the same horizontal plane with and preferably abutting against the rib $d$ on the back plate and also near their lower edges with ribs $d'$, similarly arranged with reference to the rib $d$ on the back plate.

The back and side walls or plates are provided with bosses or hubs $d^2$, which are preferably arranged adjacent to the flanges $d\ d'$, their outer faces being flush with the edges of the flanges. Upon these bosses and against the edges of the flanges are applied plates of sheet-iron, whose interior and exterior faces are enameled and which are held in position by screws $d^3$, working in threaded seats tapped in the bosses $d^2$. The spaces intervening between the enameled plates D and the outer walls B B' are packed with mineral wool, asbestos, or some other suitable refractory heat-insulating material.

The door E is composed of an outer concavo-convex plate $e$ and an inner plate $e'$, enameled upon its inner and outer face, the two plates being suitably united and the intervening spaces packed with asbestos, mineral wool, or other suitable material. The upper bar or cross-piece of the door-frame has formed or cast upon it an inwardly-projecting flange $c$ opposite and in line with the flange or rib $d$ on the back wall B. These two flanges serve to support the inner, top, or roof plate F of the oven, which is made of cast-iron with multiple projecting teats or ribs $f$ on its inner face and with flanges $f'\ f'$ at its front and rear edges, which rest upon the rib or flange $d$ on the back wall and upon the flange $c$ at the front. Near its front edge the roof-plate F is formed with a series of apertures $f^2$, through which pass the products of combustion, that then traverse rearwardly between the roof-plate F and the removably-attached top G to the discharge-outlet $g^3$ in the top plate near the rear of the stove and with which a pipe $g^4$ is connected to convey the products of combustion to any suitable point, as into the ordinary stack or flue. The top plate G is covered by a plate of sheet-iron $g$, enameled on its inner and outer face.

The exterior faces of the back wall, the side walls, and that of the outer plate of the door may all be enameled, so that the exterior surfaces of the oven may readily be kept perfectly clean.

Within the door-frame and on each side thereof are two apertured lugs H H to receive the trunnions or hinge-bearings $h\ h$ of the swinging channeled pan or grid holders. (Shown particularly in Figs. 3, 4, and 6.) These may each consist of a skeleton rectangular frame I, of cast metal, having riveted thereto the horizontal channel-pieces $i$ to receive the trays, pans, or grids to be placed in the oven. From one side of each frame I extend the projections I' I', from each of which project upwardly and downwardly the trunnions $h\ h$. On the back of each such frame are two or more projecting pins or lugs $I^2$. The lugs $I^2$ when the swinging frames are in position in the oven abut against the inner side surfaces of the oven and hold the swinging frames in parallelism therewith, leaving a space between the adjacent side wall and the frame, which is arranged directly over a lower burner, as hereinafter described. The frames are of such width that when the door of the oven is open they may be swung outwardly and lifted from their hinge connections, so that the interior of the oven is accessible for cleaning, &c. By forming each part I' with upper and lower trunnions $h$ the frames are made interchangeable, so that either frame may be placed at either side of the door-opening at will.

The enameling of the interior surfaces of the oven while affording facility for cleaning serves also a most important purpose in that the enameled surfaces reflect to a large degree and absorb but to a small degree the heat rays that impinge upon them.

I have shown removably mounted on brackets $k$, depending from the cast-iron top plate of the oven, a burner K, having apertures on its opposite sides and which may be used for grilling in the upper part of the oven. I have also shown a burner L located at the rear and bottom portion of the oven below the rear enameled plate D and behind the rear ends of the frames I. Burners L' $L^2$ are similarly located at the lower sides of the oven directly below the spaces between the frames I and the sides of the oven. The gas-bar M is attached to one of the side brackets M', mounted on top of the oven and at each side thereof. These brackets carry the hot plate or open rectangular frame N, in which boiling and grilling burners are mounted and supplied with gas from the gas-bar by the taps $n$, mounted on the gas-bar and carrying the jets $n'$. The enameled top plate of the oven serves the useful purpose of reflecting upwardly rather than absorbing the rays of heat projected downwardly from the grilling or boiling burners mounted in or on the hot plate or frame N and may, moreover, be readily cleaned.

O represents the gas-supply pipe, leading to the gas-bar M at one end, while near the opposite end of the gas-bar is a downwardly-extending pipe O', leading to a two-way cock P. Extending laterally from this cock is a pipe P', supplying the upper burner K of the oven, and extending downwardly therefrom is a connection $P^2$, branching into gas-pipes $P^3\ P^4$, supplying, respectively, the lower side burners L' $L^2$ and the lower rear burner L. The pipe $P^3$ has a cock $p^3$ and the pipe $P^4$ a cock $p^4$. The two-way cock is shown in detail in Fig. 5. Its plug has a through-way passage $p^5$, which when in the position shown in Fig. 5 directs gas from O to the connection $P^2$, and a port or passage $p^6$, extending from one side of the plug into the passage $p^5$ and through which when the plug is turned through one quarter of a revolution gas is admitted from the pipe O to the pipe P' and excluded from the pipe $P^2$. This is a convenient and satisfactory arrangement for providing that the lower burners shall not receive gas when the upper burner K is receiving gas, and vice versa. In order to supply air exteriorly or around the upper burner K, apertures $k'$ are formed in the upper sides of the oven, and preferably a slide $k^2$ is provided to cover them when the burner K is not in operation. The rear burner L is removably seated on brackets $q\ q$, cast or attached to the inner rear side or wall of the base, and it is supplied with gas through the pipe $P^5$, a jet or nipple $q'$ thereon projecting into an open hub $q^2$ on the bottom of the gas-bar and through which air enters the burner with the gas. The side burners L' $L^2$ are constructed as indicated more particularly in Figs. 3 and 9. Each burner is a cored casting, resting at its rear end upon the pipe $P^5$ and at its forward end upon a socket or support R, cast on the rear face of the front wall of the base-plate and through which the pipe $P^6$, supplying gas to the two burners L' $L^2$, passes. Each of these burners is formed with an interior chamber (indicated by the dotted lines $s$ in Fig. 3) and from which the jets or apertures $s'$ in the side of the burner open. The front half of the burner is of considerably greater depth than the rear half, and there is formed in it a mixing-chamber $s^2$, which opens into the chamber $s$ at the point $s^5$. The construction of the burners L' $L^2$ is shown more clearly in Fig. 9. The jet $p^7$ projects from the gas-pipe $P^6$ into the open mouth of the mixing-chamber. It will be observed that the mixing-chamber lies vertically below the chamber $s$, an arrangement which insures a suitable mixing of the air and gas and its proper distribution throughout the chamber $s$, from which it emerges through the jets or apertures $s'$. The front of the base is open, as at T, for the reception of a sliding drip-pan T'. Fastened in or to the cast-iron roof of the oven is a pendent bail U, adapted to receive the end of a suspension-hook U', on which may be hung a joint or other article for roasting.

The pipe $P^4$ is connected with the pipe $P^5$ by an ordinary elbow-joint 2, and at the opposite end the pipe $P^5$ is closed by a cap 3. The pipe $P^5$ is or may be permanently secured in the base. The pipe $P^6$ is similarly connected by an elbow-joint 4 with the pipe $P^3$, while its opposite end is closed by a cap 5, and this pipe $P^6$ is or may be permanently secured in the base of the stove.

The gas-bar M is provided on each side with the laterally-projecting hooks $m$, and both side brackets M', supporting the hot plate M, are provided with like L-shaped slots $m'$ to receive the hooks $m$. Similarly each bracket M' is formed with like apertures 7 8 9 10 to receive the ends of removable burners—such, for instance, as 11, Fig. 4—removably seated on brackets 12 12, projecting from the rectangular frame or top plate. With this organization by making the necessary disconnections or breaks in the pipes the gas-bar may be transferred from the right to the left hand side of the stove, as may all the pipe connections for the oven-burners K L' $L^2$.

I do not herein claim the reversible gas-bar or the reversible connections, as such subject-matter is claimed in my application for patent filed December 29, 1900, Serial No. 41,528.

I claim as my invention—

1. A gas-cooker comprising an oven, side burners L' $L^2$, the transverse pipe for supplying them fixed in the casing and adapted to have connection made with either end thereof, the hot plate, the side brackets supporting it, the gas-bar detachably connectible with either bracket whereby the gas-bar may be placed at either side of the stove and the connections reversed, and means for connecting the gas-bar with said transverse pipe.

2. In a gas-cooker, an oven having apertured lugs at each side of the opening thereof and the swinging frames carrying the channels or runners for supporting the trays or grids and having projecting arms as I' formed with upper and lower trunnions $h\,h$, substantially as set forth.

3. In a gas-cooker, an oven having apertured lugs at each side of the opening thereof, and the swinging frames carrying the channels or runners for supporting the trays or grids, and having projecting arms, I', formed with upper and lower trunnions, $h, h$, and pins or lugs, $I^2$, substantially as set forth.

4. The combination of the oven having the enameled sides, the swinging frames, means for holding the frames away from the sides, and burners at the bottom of the oven located under the space between the frames and the enameled sides whereby the products of combustion may ascend directly upward between the frames and the enameled sides.

5. In a gas-cooker a casing inclosing a space comprising an oven and having inwardly-projecting flanges $c\,d$ near the top thereof, a removable metal plate forming a top for the oven-space and having downwardly-projecting flanges $f'\,f'$ resting upon but not secured to the first-named flanges, brackets on the under face of said plate, and a grilling-burner removably mounted on said brackets.

In testimony whereof I have hereunto subscribed my name.

EDMOND W. T. RICHMOND.

Witnesses:
KATHARINE MACMAHON,
EDWARD C. DAVIDSON.